United States Patent Office 3,578,633
Patented May 11, 1971

3,578,633
PROCESS FOR CURING POLYEPOXIDES WITH POLYCARBOXYLIC ACID ANHYDRIDES IN PRESENCE OF ALKALINE METAL SALTS OF CARBOXYLIC ACIDS
Gerd Rossa, Berkshire, England, assignor to Shell Oil Company, New York, N.Y.
No Drawing. Filed Dec. 11, 1968, Ser. No. 783,135
Claims priority, application Great Britain, Mar. 21, 1968, 13,718/68
Int. Cl. C08g 30/12
U.S. Cl. 260—47   17 Claims

ABSTRACT OF THE DISCLOSURE

Polyepoxides may be cured to an insoluble, infusible product by reacting a polyepoxide containing more than one vicinal epoxy group per molecule with a polycarboxylic acid anhydride in the presence of an alkaline metal salt of a carboxylic acid.

BACKGROUND OF THE INVENTION

It is known that acid anhydrides show little activity in the cure of the polyepoxides at room temperature or at slightly elevated temperatures and are effective only at very high temperatures, and even then in many cases act very slowly. It has been proposed to add certain curing accelerators such as lithium or sodium chlorides and iodides, but this has not met all the problems involved. For example, many of the accelerators speed the cure at high temperatures, but do not permit the use of lower cure temperatures. In other cases, the presence of the accelerator has a detrimental effect on the properties of the resulting product and, particularly, the said lithium or sodium salts, being hygroscopic in nature, cause serious surface defects when the curable polyepoxides are used as surface coating compositions.

Such disadvantages are obviated when, in accordance with the present invention, alkaline metal salts of carboxylic acids are used as curing accelerators.

SUMMARY OF THE INVENTION

The present invention provides a process for converting a polyepoxide containing more than one epoxy group per molecule into an insoluble, infusible product which comprises curing the polyepoxide with a polycarboxylic acid anhydride, in the presence of an alkaline metal salt of a carboxylic acid.

The use of the new activator gives a very rapid rate of cure at high temperatures and is particularly suited for use in the preparation of rapid-cure, high-temperature powder coatings.

DESCRIPTION OF THE PREFERRED EMBODIMENT

This invention relates to a process for curing polyepoxides with polycarboxylic acid anhydrides using a special class of curing accelerators, to the curable compositions and to the resulting cured products.

Specifically, the invention provides a composition which cures to an infusible, insoluble product which comprises (1) a polyepoxide containing at least one vicinal epoxy group per molecule, (2) a curing amount of a polycarboxylic acid anhydride and (3) from about 0.01 to 10% by weight of the polyepoxide of an alkaline metal salt of a carboxylic acid.

The polyepoxide materials used in preparing the compositions of the present invention comprise those organic materials which have more than one vic-epoxy group, i.e., more than one

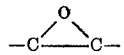

group, which group may be in a terminal position, i.e., a

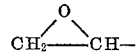

group, or in an internal position, i.e., a

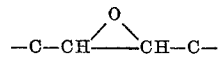

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,2-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenols with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenol)butane, 4,4'-dihydroxybenzophenone, bis(4-hydroxyphenyl)ethane, 2,2-bis(4-hydroxyphenyl)pentane and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated polyethers A, B, C and D.

Another group of polyepoxides comprises the polyepoxypolyethers obtained by reacting, preferably in the presence of an acid-acting compound, such as hydrofluoric acid, or of the afore-described halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4-hydroxycyclohexyl)dimethylmethane and the like.

The preparation of suitable such polyepoxide polyethers is illustrated in U.S. 2,633,458 as polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung tung, walnut and dehydrated castor oil, methyl linoleate, butyl linolinate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3-epoxybutyl)adipate, di(2,3-epoxybutyl)oxalate, di(2,3-epoxyhexyl)succinate, di(2,3-epoxyoctyl)tetrahydrophthalate, di(4,5-epoxydodecyl)maleate, di(2,3-epoxybutyl)terephthalate, di(2,3-epoxypentyl)thiodipropionate, di(2,3-epoxybutyl)citrate and di(4,5-epoxyoctadecyl)maleonate, as well as the esters of epoxycyclohexanol and epoxycyclohexylalkanois, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhyxyl 3,4-epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl-8,9,12,13-diepoxyeicosanedioate, dicyclohexyl 3,4,5,6-diepoxycyclohexanedicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene-styrene copolymers and the like.

Still another group includes the epoxidized hydrocarbons, such as epoxidized 2,3-bis(cyclohexenyl)propane, 2,2-bis(cyclohexenyl)butane, 8,10-octadecadiene and the like.

Other suitable polyepoxides are obtained by the epoxidation of cyclohexene derivatives, such as the 3,4-epoxy-6-methylcyclohexylmethyl ester of 3,4-epoxy-6-methylcyclohexanecarboxylic acid or the 3,4-epoxy-cyclohexylmethyl ester of 3,4-epoxy cyclohexane carboxylic acid.

The polycarboxylic acid anhydrides which are suitable include the anhydrides of at least dibasic carboxylic acids. They may be saturated, unsaturated, aliphatic, cycloaliphatic, aromatic or heterocyclic, and may possess 1,2,3 or more anhydride groups. Examples of these anhydrides include, among others, phthalic anhydride, di-, tetra- and hexahydrophthalic anhydride, 3,4,5,6,7,7-hexachloro-3,6-endomethylene 1,2-tetrahydrophthalic anhydride (chlorendic anhydride), succinic anhydride, maleic anhydride, chlorosuccinic anhydride, monochloromaleic anhydride, octadecylsuccinic anhydride, dodecylsuccinic anhydride, dodecenyl succinic anhydride, dioctylsuccinic anhydride, nonadecadienylsuccinic anhydride, adducts of maleic anhydride with polyunsaturated compounds such as methylcyclopentadiene (such an adduct is known in the art as Nadic® methyl anhydride), trimellitic anhydride, pyromellitic anhydride, adipic anhydride, azelaic anhydride, and sebacic anhydride and mixtures thereof. Anhydrides which also contain other groups in the molecule and may also be employed, for example, partial esters of glycols or glycerol and trimellitic anhydride.

Other suitable anhydrides include the benzophenone tetracarboxylic dianhydrides of the structural formula:

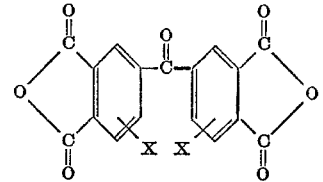

wherein X represents hydrogen, halogen, —NO₂, —COOH, —SO₃H or —NH₂ may be the same or different radical.

Representative benzophenone tetracarboxylic dianhydrides include, among others, 3,3′,4,4′-benzophenone tetracarboxylic dianhydride; 2-bromo-3,3′4,4′-benzophenone tetracarboxylic dianhydride; 2-carboxy-2′-sulfo-3,3′,4,4′-benzophenone tetracarboxylic anhydride; 2-amino-2,3′,4,4′-benzophenone tetracarboxylic dianhydride; and 5-nitro-3,3′,3,4′-benzophenone tetracarboxylic dianhydride.

Preferred anhydrides comprise the aliphatic, cycloaliphatic and aromatic anhydrides having one or two cyclic anhydride groups per molecule, such as pyromellitic or trimellitic anhydride, and the chlorinated derivatives of these compounds. Especialy preferred are the anhydrides which have a melting point above 20° C., more preferably above 60° C.

The amount of the anhydride to be used in the present compositions and process will vary over a wide range.

Good cures are obtained by reacting one chemical equivalent of the polyepoxide with a least 0.5 equivalent and more preferably with from 0.7 to 1.2 equivalent of the anhydride. As used herein in relation to the amount of anhydride and polyepoxide, the expression "equivalent" amount refers to that amount of anhydride needed to provide one anhydride group for every epoxy group in the polyepoxide to be involved in the cure.

Suitable alkaline metal salts of carboxylic acids are lithium, sodium or potassium salts and most preferably lithium salts of aliphatic cycloaliphatic, aromatic and heterocyclic mono, di or tri carboxylic acids such as acetic, butanoic, heptanoic, 2-ethylhexanoic, cyclohexanoic, benzoic, phthalic, phenylacetic, mandelic, palmitic, stearic, oleic, myristic, lauric, ricinoleic, naphthenic, methylbenzoic, tert-butylbenzoic, pyromellitic, trimellitic, maleic, glutaric and adipic acid.

Preferred accelerators are those derived from aliphatic fatty acids with from 6 to 20 carbon atoms. Another group of preferred metal salts are those derived from acids containing at least one carboxylic group which is directly attached to a carbocyclic, most suitably an aromatic, ring structure, for example, benzoic, phthalic or naphthenic acid.

Usually only a relatively small amount of the metal salt accelerator varying from 0.01 to 10% by weight of polyepoxide is sufficient to obtain a satisfying cure. More preferably the amounts used vary from 0.1 to 2% by weight.

Curing of the present systems is generally effected at an elevated temperature, for example, between 50 and 200° C., but curing at room temperature can also be utilized.

In the process according to the invention a variety of additives may be employed such as pigments, fillers, solvents, reactive diluents, fibrous materials, dyes, plasticizers and non-volatile extenders, such as coal tar, coal tar pitch, pine oil, lube oil fractions, aromatic extracts thereof and asphaltic bitument. Other additives include additional curing agents such as phenol-aldehyde resins, urea-aldehyde resins, furfural resins, polyamide resins and melamine-formaldehyde resins.

It will be understood that the above-described curing systems comprisig a polyepoxide containing on average more than one vic-epoxy group per molecule, a polycarboxylic acid anhydride and an alkaline metal salt of a carboxylic acid are also included within the scope of this invention. These curable compositions can be applied for many important purposes, such as the production of castings, the encapsulation of electrical equipment, the preparation of laminates by impregnating fibrous materials with the curing system and subjecting the impregnated materials to elevated temperature under pressure, and the shaping of articles by filament winding techniques. Another important application is the preparation of coatings by means of powder coating techniques in which use is made of a powdered, solid polyexpoxide in admixture with a powdered, solid polycarboxylic anhydride and the curing accelerator.

The present compositions are especially suitable for use in the powder coating fields such as in fluidized beds.

In general, the average particle size of the powders may range from rather small particle sizes of, say 5 microns or even smaller, to 600 microns or greater. An especially preferred range is between 50 and 300 microns. A very suitable fluidizable composition was prepared by micropulverizing the blended components to pass through 100 mesh size screen (147 microns).

Any of the conventional fluidized bed coating techniques may be employed wherein the fluidized bed comprises the instant compositions maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C., before it is dipped into the fluidized bed. If an article is to be completely coated it should, of course, be completely immersed in the fluidized bed. The article is preferably moved backwards and forwards in the bed, over a period of time determined by the desired thickness of coating. For the production of thin coatings, i.e., less than 0.015 inch thick, the period during which an article is dipped or immersed into the bed is usually less than 3 seconds.

After the article has been in contact with the fluidized bed for the desired time, it is removed, excess powder adhering to the article is preferably removed, and the coating cured by heating to at least 125° C., preferably between 150 and 250° C.

The compositions of the instant invention may also be sprayed as by a compressed air spray gun or electrostatically, i.e., by maintaining a difference in electrostatic change between the particles and the article to be coated.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

Examples I to VI

A 70 micron thick coating was applied to steel panels and rods by means of electrostatically spraying compositions containing 734 parts of a glycidyl polyether of 2,2-bis(4-hydroxyphenyl)propane having a molecular weight of 1400 and an average epoxy equivalent weight of about 950, 105 parts of 3,3'-7,7'-benzophenone tetracarboxylic anhydride, 73 parts of titanium dioxide, 37 parts of a green chromium pigment, and 7.3 parts of the various metal salts listed in the Table I.

Curing of the compositions was effected at 150 and 200° C., respectively, and curing was regarded as satisfactory when the coatings of the rods displayed no softening when immersed in butanone-2 during 5 minutes (Test Method A )or when the coated panels successfully passed the Ericson slow penetration test applying a penetration of 8 millimeters (Test Method B). The figures included in Table I indicate the minimum curing periods (in minutes) required to give a satisfactory cure.

TABLE I

| Metal salt | Cure at 150° C. Test Method | | Cure at 200° C. Test Method | |
| --- | --- | --- | --- | --- |
|  | A | B | A | B |
| Lithium benzoate | 3 | 3 | 2 | 2 |
| Lithium naphthenate | 30 | 30 | 5 | 3 |
| Lithium stearate | 15 | 35 | 5 | 3 |
| Lithium ricinoleate | 7 | 7 | 5 | 3 |
| Potassium benzoate | 15 | 10 | 2 | 2 |
| Sodium benzoate | 7 | 10 | 5 | 3 |

Examples VII to XI

The procedures of Examples I to VI are substantially repeated wherein an equivalent amount of a glycidyl polyether of 2,2-bis(4-hydroxyphenyl)propane having an average molecular weight of 2900, and an epoxide equivalent weight of about 2000 is employed in lieu of the glycidyl polyether having a molecular weight of 1400. Related results are obtained.

Examples XII to XVII

The procedures of Examples I to VI are substantially repeated wherein an equivalent amount of pyromellitic anhydride is used in lieu of 3,3'-7,7'-benzophenone tetracarboxylic anhydride. Related results are obtained.

I claim as my invention:

1. A process for converting a polyepoxide containing more than one vicinal-epoxy group per molecule into an insoluble, infusible product, which comprises curing the polyepoxide with a polycarboxylic acid anhydride in the presence of an alkaline metal salt of a carboxylic acid selected from the group consisting of (a) aliphatic carboxylic acids having from 6 to 20 carbon atoms and (b) aromatic carboxylic acids selected from the group consisting of benzoic, phthalic and naphthenic acids.

2. A process as in claim 1 wherein the polyepoxide is a glycidyl polyether of a polyhydric phenol or a polyhydric alcohol.

3. A process as in claim 2 wherein the polyhydric phenol is 2,2-bis(4-hydroxyphenyl)propane.

4. A process as in claim 1, in which the polyepoxide is solid at room temperature.

5. A process as in claim 1 wherein the polycarboxylic acid anhydride has a melting point above 20° C.

6. A process as in claim 1 wherein the alkaline metal salt is a lithium salt.

7. A process as in claim 1 wherein the alkaline metal salt is lithium benzoate.

8. A process as in claim 1 wherein the acid is benzoic acid.

9. A process as in claim 1 wherein the metal salt is present in an amount from about 0.1 and 2% by weight of polyepoxide.

10. A heat-curable composition consisting essentially of (1) a polyepoxide having more than one vicinal-epoxy group per molecule, (2) a curing amount of a polycarboxylic acid anhydride and (3) from 0.01% to 10% by weight of the polyepoxide of an alkaline metal salt of a carboxylic acid selected from the group consisting of (a) aliphatic carboxylic acids having from 6 to 20 carbon atoms and (b) aromatic carboxylic acids selected from the group consisting of benzoic, phthalic and naphthenic acids.

11. A composition as in claim 10 wherein the polyepoxide is a glycidyl polyethyl of a polyhydric phenol.

12. A composition as in claim 11 wherein the polyepoxide is a glycidyl polyether of 2,2-bis(4-hydroxyphenyl)propane.

13. A composition as in claim 10 wherein the alkaline metal salt is derived from stearic or ricinoleic acid.

14. A composition as in claim 10 wherein the alkaline metal salt is lithium benzoate.

15. A composition as in claim 10 wherein the alkaline metal salt is present in an amount from about 0.1 to 2% by weight of the polyepoxide.

16. A composition as in claim 10 wherein the polycarboxylic acid anhydride is pyromellitic anhydride.

17. The cured composition of claim 10.

References Cited
UNITED STATES PATENTS

| | | | |
|---|---|---|---|
| 3,294,865 | 12/1966 | Price | 260—2EPX |
| 3,006,891 | 10/1961 | Nikles | 260—47EP |
| 3,431,237 | 3/1969 | Harry | 260—47EP |

WILLIAM H. SHORT, Primary Examiner

T. E. PERTILLA, Assistant Examiner

U.S. Cl. X.R.

117—161; 161—184; 260—18, 28, 75, 78.4, 830, 831, 834